United States Patent
Ikuta et al.

(10) Patent No.: US 6,595,449 B2
(45) Date of Patent: Jul. 22, 2003

(54) FISHING LINE GUIDING MECHANISM FOR SPINNING REEL

(75) Inventors: Takeshi Ikuta, Sakai (JP); Koji Takikura, Izumi (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/237,600

(22) Filed: Sep. 10, 2002

(65) Prior Publication Data

US 2003/0066919 A1 Apr. 10, 2003

(30) Foreign Application Priority Data

Oct. 9, 2001 (JP) ........................................ 2001-311020

(51) Int. Cl.⁷ .............................................. A01K 89/01
(52) U.S. Cl. .................................... 242/231; 242/157 R
(58) Field of Search ................................ 242/230, 231, 242/232, 233, 157 R

(56) References Cited

U.S. PATENT DOCUMENTS

| | | | |
|---|---|---|---|
| 5,782,418 A | * 7/1998 | Kaneko et al. | 242/231 |
| 5,944,274 A | * 8/1999 | Kaneko | 242/231 |
| 5,954,284 A | * 9/1999 | Tsukihiji et al. | 242/231 |
| 6,227,474 B1 | * 5/2001 | Okada | 242/231 |
| 6,311,913 B1 | * 11/2001 | Yasui et al. | 242/231 |
| 6,336,604 B1 | * 1/2002 | Aratake et al. | 242/231 |
| 6,405,955 B2 | * 6/2002 | Furomoto | 242/231 |

FOREIGN PATENT DOCUMENTS

| | | |
|---|---|---|
| EP | 1 121 855 A1 | 8/2001 |
| FR | 1506359 A | 12/1967 |

* cited by examiner

*Primary Examiner*—Emmanuel Marcelo
(74) *Attorney, Agent, or Firm*—Shinjyu Global IP Counselors, LLP

(57) ABSTRACT

A bail arm includes a bail, a fixed shaft formed by a machining process, a line roller supported by fixed shaft, and a fixed shaft cover formed in one piece with fixed shaft by a die forming process. Fixed shaft cover includes a guiding portion and a recessed portion. Recessed portion is formed on a side of fixed shaft cover opposite guiding portion with respect to bail. Guiding portion includes a cylindrical portion. Fixed shaft cover is formed such that the angle $\alpha$ defined by center axis A of cylindrical portion and axis B of fixed shaft is at least 8° and at most 30°, and axial length L of cylindrical portion is at least 1 mm and at most 3 mm. The present invention provides a fishing line guiding mechanism with which fishing line can be guided smoothly to line roller.

14 Claims, 5 Drawing Sheets

FISHING LINE GUIDING MECHANISM FOR SPINNING REEL

BACKGROUND OF THE INVENTION

1. Field of the Invention

This invention generally relates to a fishing line guiding mechanism. More specifically, the present invention relates to a fishing line guiding mechanism of a spinning reel that guides fishing line onto a spool.

2. Background Information

Spinning reels are provided with a mechanism for guiding fishing line onto a spool. Such fishing line guiding mechanism is mounted to the ends of a first rotor arm and a second rotor arm, so as to be rotatable together with the rotor and pivotable between a line-releasing position and a line-guiding position. Such a fishing line guiding mechanism includes a first bail support member and a second bail support member, a fixed shaft, a fixed shaft cover, a wire-shaped bail, and a line roller. One end of the fixed shaft is fixed to the end of the first bail support member. The fixed shaft cover is fixed to the other end of the fixed shaft. One end of the bail is fixedly inserted into the fixed shaft cover. The other end of the bail is attached to the end of the second bail support member.

To wind fishing line around the spool of a spinning reel having such fishing line guiding mechanism, the bail is pivoted into the line-guiding position and the handle is turned. Accordingly, the bail leads the fishing line over the fixed shaft cover to contact the outer peripheral surface of the line roller. Then, guided by the line roller, the direction of the fishing line is changed, such that the fishing line is wound around the spool.

Generally, this kind of fishing line guiding mechanism has designs with the fixed shaft and the fixed shaft cover that are formed in one piece by a machining process, such as cutting. Where the piece is cut from a round metal slab, the part that will become the fixed shaft cover is held by a chuck first, and the fixed shaft is formed by cutting. Then, the formed fixed shaft is held by the chuck and the fixed shaft cover is formed by cutting.

With such conventional fishing line guiding mechanism, the fixed shaft and the fixed shaft cover are formed in one piece by a machining process such as cutting. Therefore, the cutting process takes a long time, and the prolonged cutting process may lead to an increase in manufacturing costs. Moreover, when the fixed shaft cover is cut, the crest portion tends to be formed acutely, so that further machining is necessary to make the crest portion smooth, which further increases the manufacturing costs.

On the other hand, a step may be formed at the juncture between the fixed shaft cover and the bail. When such a step is created, the fishing line could get caught in the step, which leads to entanglement of the fishing line.

In view of the above, there exists a need for a fishing line guiding mechanism which overcomes the above mentioned problems in the prior art. This invention addresses this need in the prior art as well as other needs, which will become apparent to those skilled in the art from this disclosure.

SUMMARY OF THE INVENTION

An object of the present invention is to provide a fishing line guiding mechanism for a spinning reel, with which the manufacturing costs can be reduced, and with which the fishing line can be guided smoothly to the line roller.

A fishing line guiding mechanism for a spinning reel in accordance with a first aspect of the invention, in which the fishing line guiding mechanism is mounted pivotably between a line-guiding position and a line-releasing position to ends of a first rotor arm and a second rotor arm and guiding fishing line to a spool, includes a first bail support member and a second bail support member mounted pivotably to respective ends of the first rotor arm and the second rotor arm; a fixed shaft made by a machining process, one end of the fixed shaft being fixed to the first bail support member; a fixed shaft cover disposed at a predetermined spacing from the first bail support member on the other end of the fixed shaft, having a guiding portion that guides fishing line along its outer circumference, and has a cylindrical portion having a cylindrical outer circumference, the fixed shaft cover being formed by a die forming process such that an angle defined by the center axis of a cylindrical portion and the axis of the fixed shaft is at least 8° and at most 30°; a line roller supported rotatably by the fixed shaft and provided with a roller for guiding fishing line around its peripheral surface; and a bail having two ends that are fixed to the second bail support member and at least one of the fixed shaft and the fixed shaft cover, the bail being curved outward in circumferential direction with respect to the spool, and guiding the fishing line over the fixed shaft cover to the line roller.

With this fishing line guiding mechanism, the fixed shaft cover is formed by a die forming process such as forging, molding or die casting, whereas the fixed shaft can be formed by a machining process such as cutting, while holding the cylindrical portion of the fixed shaft cover in a chuck. Here, the fixed shaft cover is formed by die forming, so that the manufacturing costs can be reduced compared to the case where the fixed shaft cover is formed by a machining process.

Moreover, the fixed shaft cover is formed such that the angle defined by the center axis of the cylindrical portion and the axis of the fixed shaft is at least 8° and at most 30°, so that the guiding path of the fishing line from the bail to the line roller is connected smoothly. Therefore, even when there is a step at the juncture between the fixed shaft cover and the bail, the fishing line is not easily caught. Consequently, the fishing line can be guided smoothly from the bail to the line roller.

According to a second aspect of the invention, in a fishing line guiding mechanism of the first aspect, the fixed shaft cover is formed such that an axial length of the cylindrical portion is at least 1 mm and at most 3 mm. In this case, the fixed shaft cover can be made lighter, and the machining process (e.g. cutting) can be performed with high precision.

According to a fishing line guiding mechanism of a third aspect of the invention, in a fishing line guiding mechanism of the first or second aspect of the invention, the fixed shaft cover is cone-shaped having a vertex portion, and one end of the bail is joined with the fixed shaft cover such that the bail and the guiding portion form a continuously smooth surface. In this case, a convex vertex at which the fishing line tends to be caught is hidden by the bail, so that the fishing line is guided more smoothly to the line roller.

According to a fishing line guiding mechanism of a fourth aspect of the invention, in a fishing line guiding mechanism of the third aspect of the invention, a concave recessed portion is formed on a side of the fixed shaft cover opposite the guiding portion with respect to the bail. In this case, by forming the recessed portion in addition to the caulking hole for caulking and fastening the bail, the fixed shaft cover can be made lighter by an amount corresponding to the recessed portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
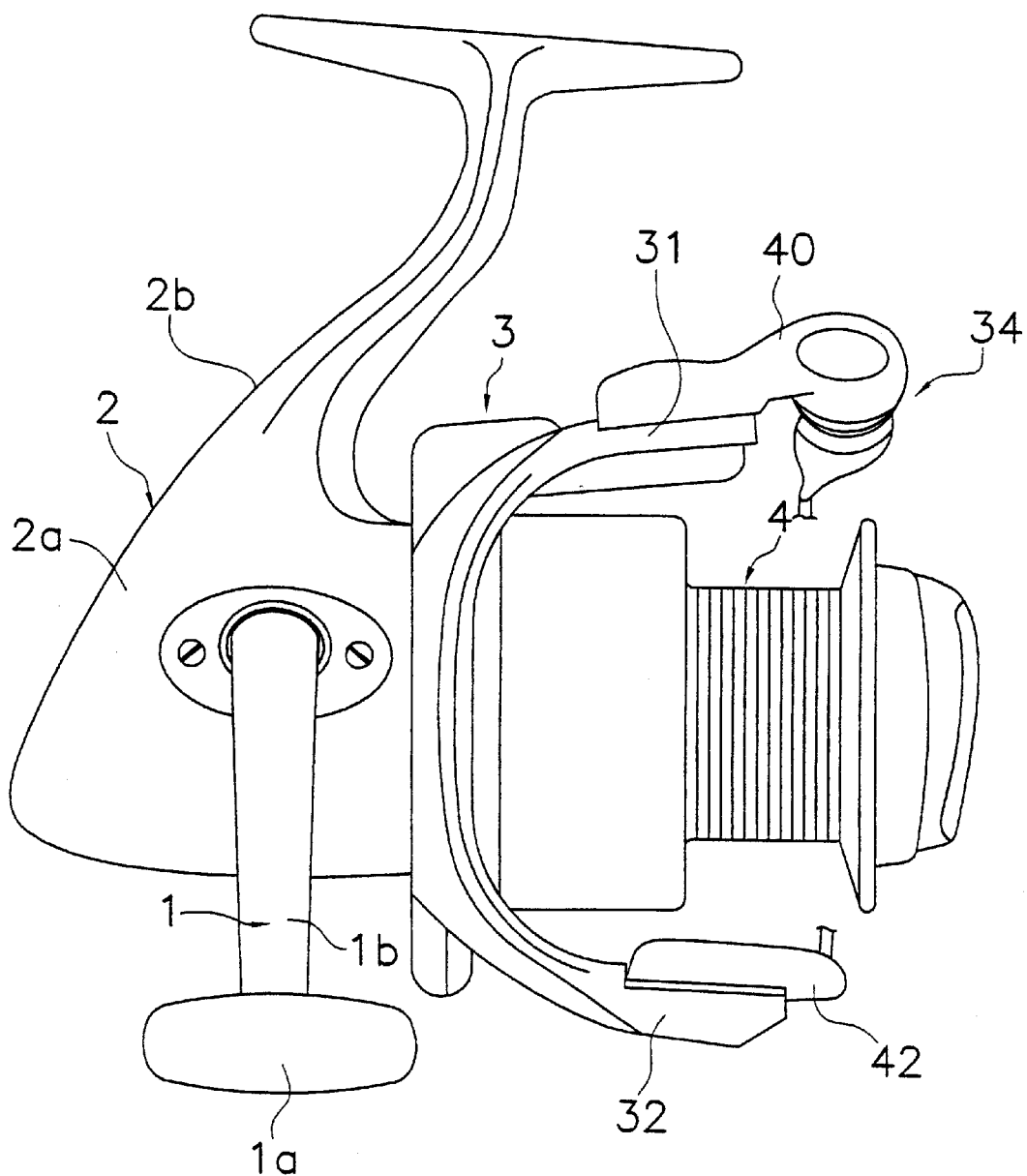
FIG. 1 is a right side lateral view of a spinning reel in accordance with an embodiment of the present invention.
Figure 2:
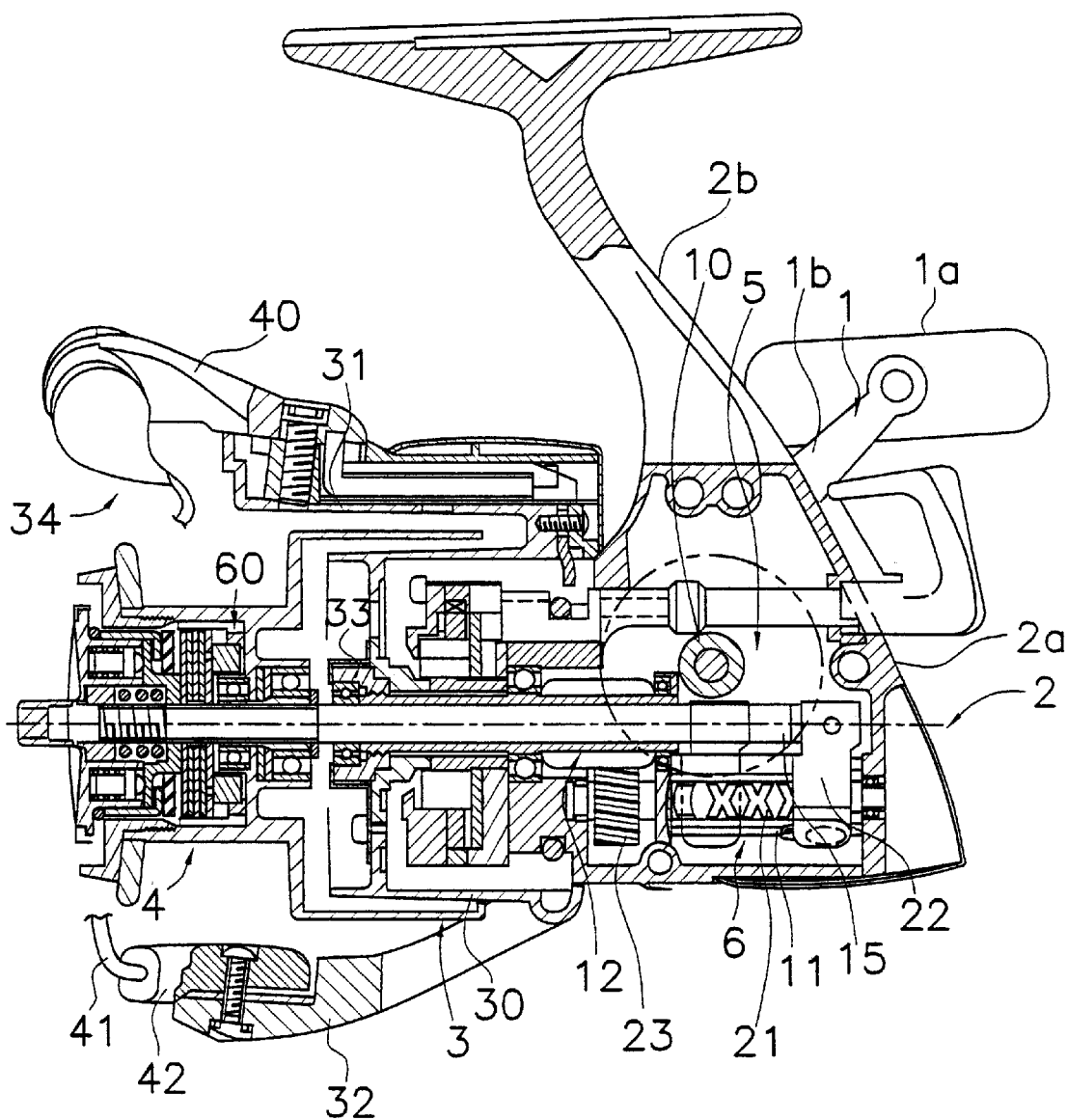
FIG. 2 is a left side cross-sectional view of the spinning reel in accordance with the embodiment of the present invention.

As shown in FIGS. 1 and 2, a spinning reel in accordance with an embodiment of the present invention includes a handle 1, a reel unit 2 rotatively supporting the handle 1, a rotor 3, and a spool 4. The rotor 3 is rotatively supported at the front of the reel unit 2. The fishing line is wound around the outer peripheral surface of the spool 4, which is disposed at the front of the rotor 3 and can be shifted front and rear.

The handle 1 includes a T-shaped grip portion 1a and an L-shaped crank arm 1b. The grip portion 1a is rotatively attached to the tip of the crank arm 1b.

As shown in FIGS. 1 and 2, the reel unit 2 includes a reel body 2a having an opening on its side and a T-shaped rod attachment leg 2b extending diagonally upward to the front and formed as one piece with the reel body 2a. As shown in FIG. 2, the reel body 2a has a mechanism-accommodating space inside, which accommodates a rotor driving mechanism 5 and an oscillating mechanism 6. The rotor driving mechanism 5 transmits the rotation of the handle 1 to rotate the rotor 3. The oscillating mechanism 6 is for winding up the fishing line uniformly on the spool 4 by shifting the spool 4 front and rear.

As shown in FIGS. 1 and 2, the spool 4 is disposed between a first rotor arm 31 and a second rotor arm 32 of the rotor 3, which will be explained below. A drag mechanism 60 (see FIG. 2) links the center of the spool 4 to the front end of a spool shaft 15.

As shown in FIG. 2, the rotor driving mechanism 5 includes a handle shaft 10, a master gear 11 and a pinion gear 12. The master gear 11 rotates together with the handle shaft 10, on which the handle 1 is mounted non-rotatively. The pinion gear 12 meshes with the master gear 11. Both ends of the handle shaft 10 are supported rotatively in the reel unit 2 via bearings. Both ends of the handle shaft 10 are provided with female threaded portions of different thread direction and diameter, such that the handle 1 can be mounted non-rotatively to these female thread portions.

The pinion gear 12 is a tubular member. The front portion of the pinion gear 12 penetrates the center of the rotor 3, and is fixed to the rotor 3 via a nut 33. The middle portion and the rear end of the pinion gear 12 are rotatively supported by bearings in the reel unit 2.

The oscillating mechanism 6 shifts the spool 4 back and forth. As shown in FIG. 2, the oscillating mechanism 6 includes a threaded shaft 21, a slider 22, and an intermediate gear 23. The threaded shaft 21 is arranged substantially below and in parallel with the spool shaft 15. The slider 22 moves front and rear along the threaded shaft 21. The intermediate gear 23 is fixed to the front end of the threaded shaft 21. The rear end of the spool shaft 15 is fixed non-rotatively to the slider 22. The intermediate gear 23 meshes with the pinion gear 12.

As shown in FIG. 2, the rotor 3 includes a cylindrical portion (rotor body) 30 fixed to the pinion gear 12, a first rotor arm 31 and a second rotor arm 32, which are disposed opposite one another at the sides of the cylindrical portion 30, and a bail arm 34, which functions as a fishing line guiding mechanism for guiding fishing line onto the spool 4. The cylindrical portion 30 and the first and second rotor arms 31 and 32 can be made, for example, of an aluminum alloy, and are formed as one unitary piece. The front and center portion of the cylindrical portion 30 is fixed non-rotatively to the front portion of the pinion gear 12 with the nut 33, as mentioned above. Accordingly, rotation of the handle 1 can transmitted to the cylindrical portion 30.

Figure 3:
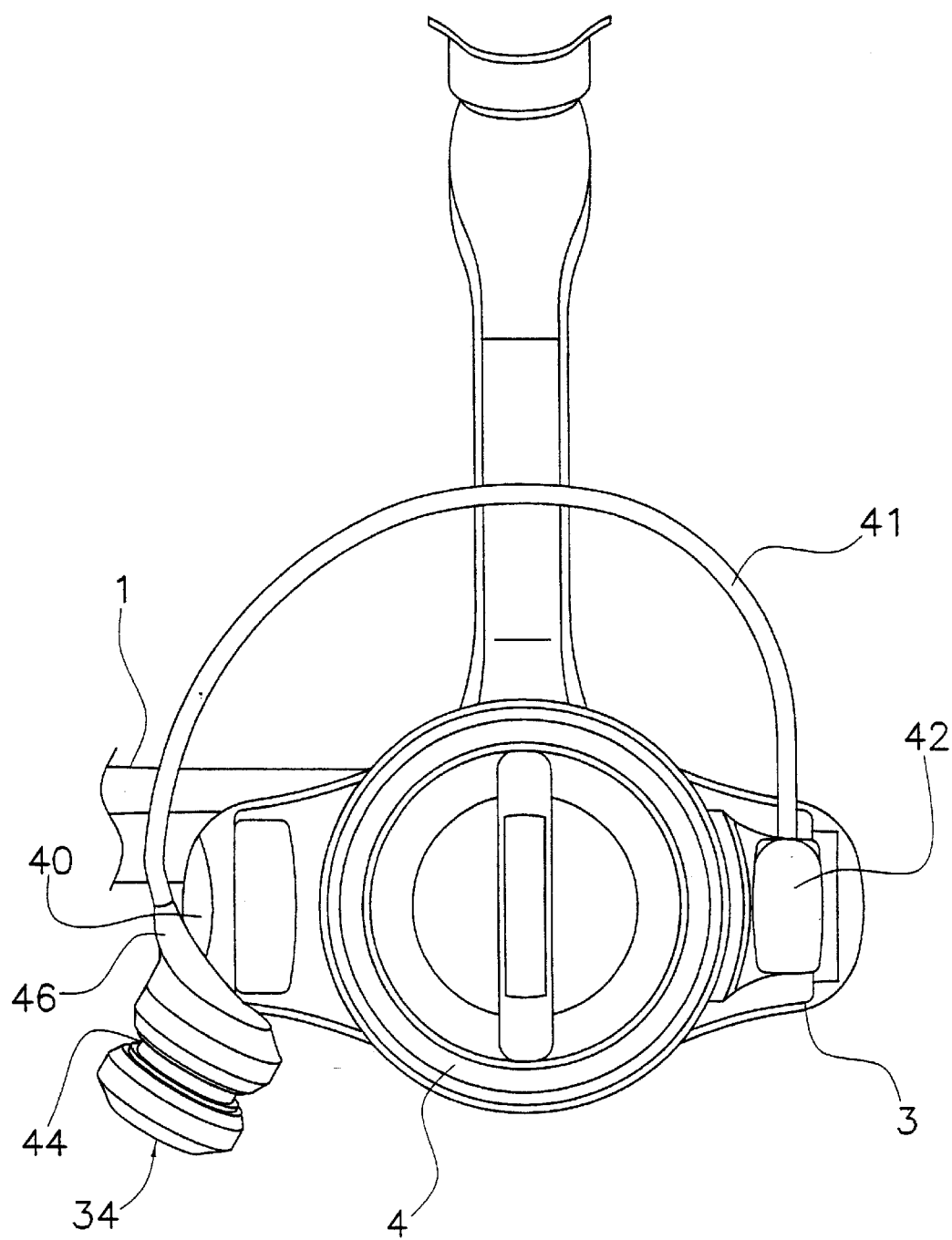
FIG. 3 is a front view of the spinning reel spool in accordance with the embodiment of the present invention.
Figure 5:
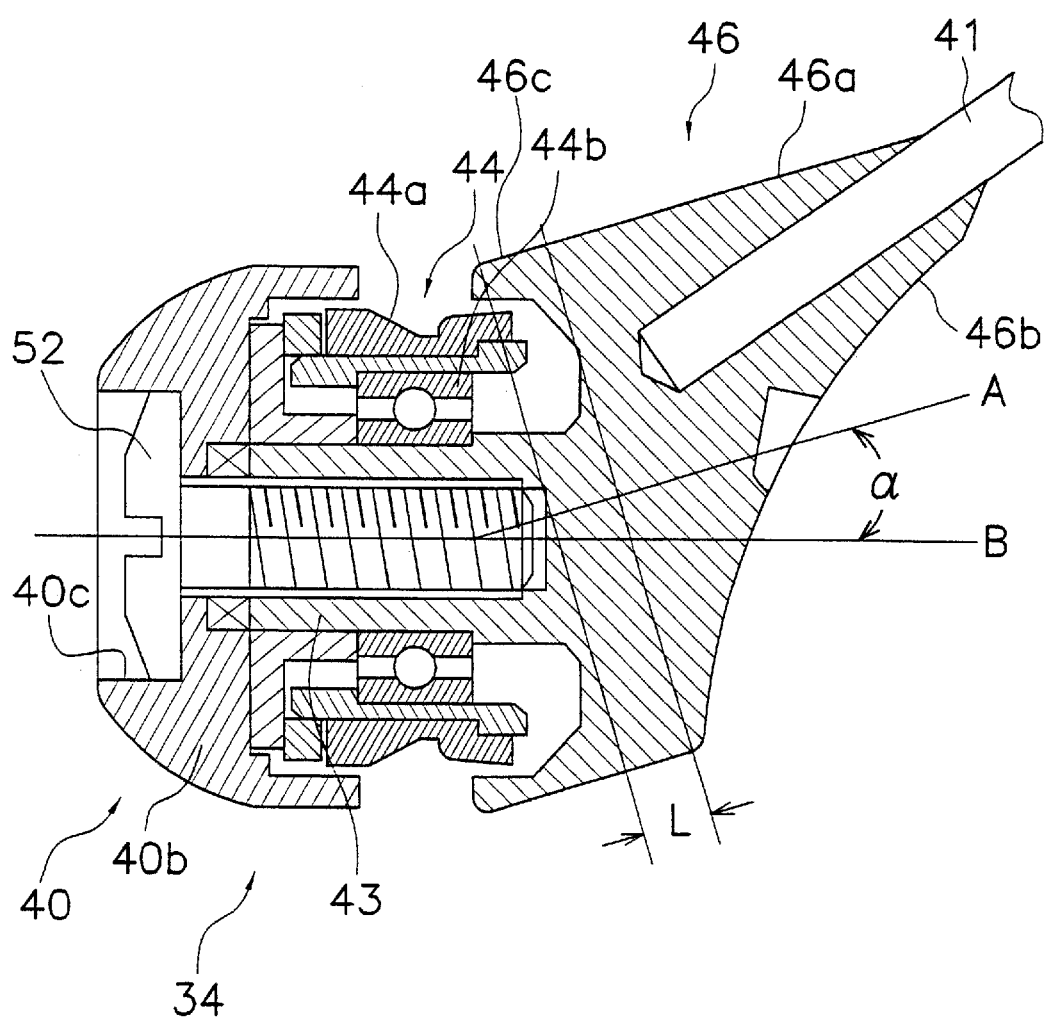
FIG. 5 is an enlarged cross-sectional view of the bail arm of the spinning reel spool in accordance with the embodiment of the present invention.

The bail arm 34 is disposed at the tips of the first rotor arm 31 and the second rotor arm 32, and is pivotable between a line-guiding position and a line-releasing position. The bail arm 34 includes a first bail support member 40 and a second bail support member 42 that are mounted pivotably on the tips of the first rotor arm 31 and the second rotor arm 32, respectively. The first bail support member 40 is mounted pivotably to an outer side of the first rotor arm 31, whereas the second bail support member 42 is mounted to an inner side of the second rotor arm 32. As shown in FIGS. 3 and 5, the bail arm 34 further includes a bail 41, a fixed shaft 43 (see FIG. 5), a line roller 44, and a fixed shaft cover 46. The bail 41 connects the first bail support member 40 and the second bail support member 42. The end of the fixed shaft 43 is fixed to the first bail support member 40. The line roller 44 is supported by the fixed shaft 43, which is covered by the fixed shaft cover 46.

Figure 4:
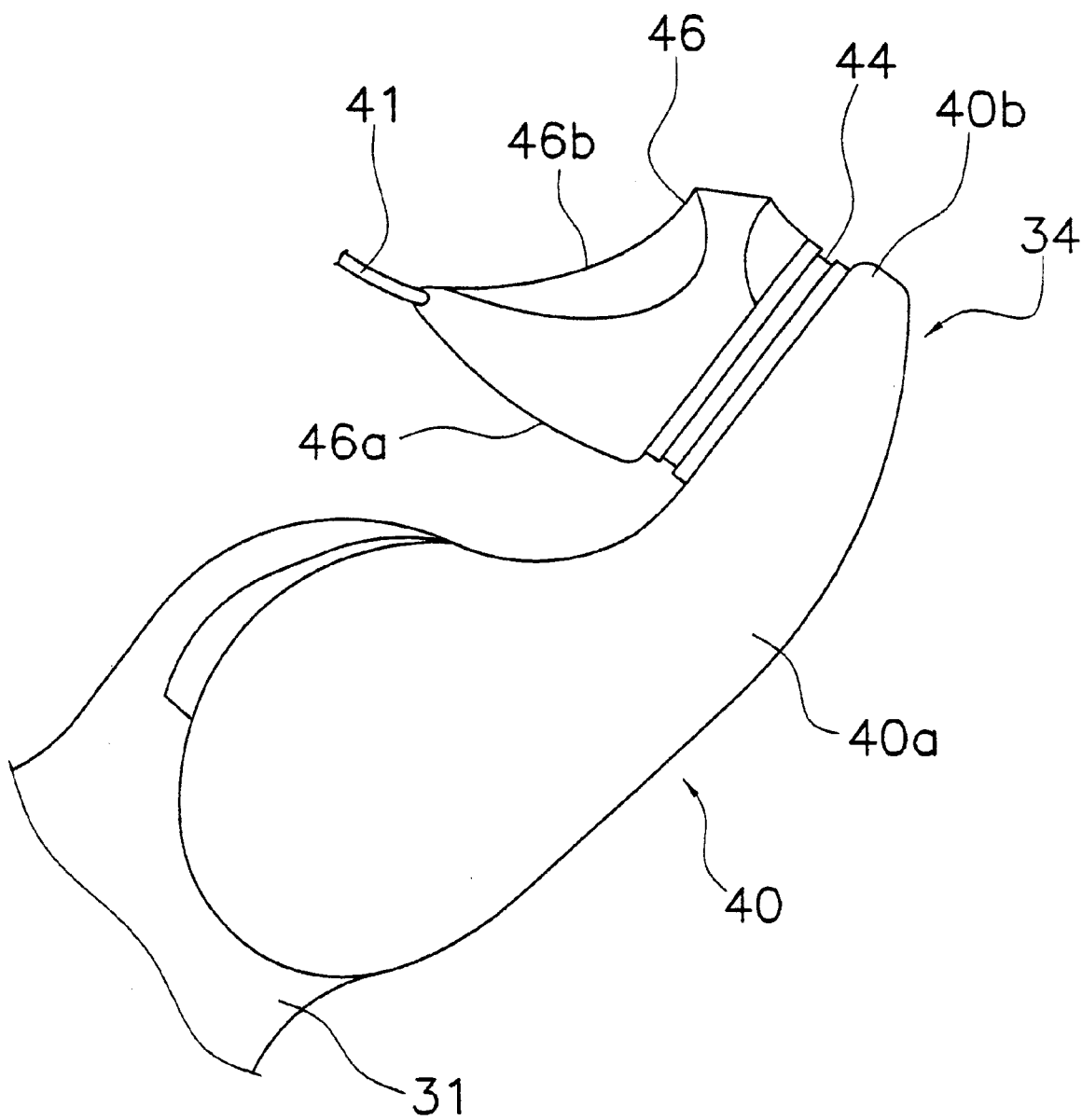
FIG. 4 is an enlarged view of the bail arm of the spinning reel spool in accordance with the embodiment of the present invention.

As shown in FIGS. 4 and 5, the first bail support member 40 includes an arm portion 40a, mounted pivotably on the first rotor arm 31, and a ring-shaped mounting portion 40b formed in one unitary piece with the arm portion 40a. The mounting portion 40b is provided with a stepped through hole 40c (see FIG. 5), and a fixing bolt 52 for fixing the fixed shaft 43 to the first bail support member 40 is passed through the through hole 40c.

As shown in FIG. 3, the bail 41 is a wire-shaped member that is caulked on both sides to the second bail support member 42 and the fixed shaft cover 46, and curves outward in circumferential direction around the spool 4. When the bail arm 34 has returned from the line-releasing position to the line-guiding position, the bail 41 guides the fishing line over the fixed shaft cover 46 to the line roller 44.

As shown in FIG. 5, the fixed shaft 43 is formed in a machining process such as a cutting process, such that the fixed shaft 43 and the fixed shaft cover 46 form one unitary piece. The fixed shaft 43 extends from a base, which the fixed shaft 43 shares with the fixed shaft cover 46, toward the first bail support member 40. The front end of the fixed shaft 43 is fixedly coupled by the fixing bolt 52.

As shown in FIG. 5, the line roller 44 includes a tubular roller 44a whose peripheral surface is provided with a groove for guiding fishing line, and a ball bearing 44b arranged at a certain axial spacing on the inner peripheral side of the roller 44a. The roller 44a is rotatively supported by the fixed shaft 43 through this ball bearing 44b.

The fixed shaft cover 46 is provided at the base end of the fixed shaft 43, at a predetermined spacing from the mounting portion 40b of the first bail support member 40. The fixed shaft cover 46 is formed by a die forming process such as forging. The fixed shaft cover 46 is a substantially cone-shaped member whose vertex is pointing away from the center of the fixed shaft 43, toward the rear of the reel and in the outward radial direction with respect to the spool 4. The bail 41 is fixedly caulked with a portion of the fixed shaft cover 46 slightly offset from the vertex, extending in a direction that is tilted toward a guiding portion 46a relative to the direction in which the vertex points. The bail 41 smoothly joins the contour of the portion of the fixed shaft cover 46 near its vertex, such that the bail 41 and the guiding portion 46a of the fixed shaft cover 46 form a continuously smooth surface on which the fishing line is guided.

As shown in FIG. 5, the fixed shaft cover 46 includes the guiding portion 46a and a recessed portion 46b. The guiding portion 46a guides the fishing line along its outer circumference, and has a cylindrical portion 46c. The recessed portion 46b is made by forming a concave portion on a side of the fixed shaft cover 46 opposite the guiding portion 46a. The cylindrical portion 46c is a portion of the guiding portion 46a in which the outer periphery defines a cylindrical shape. The cylindrical portion 46c is formed below the recessed portion 46b. The axial length L of the cylindrical portion 46c is at least 1 mm and at most 3 mm. Thus, the weight of the fixed shaft cover 46 can be reduced, and the precision with which the cutting process is performed can be improved.

Moreover, the fixed shaft cover 46 is formed such that the angle $\alpha$ defined by the center axis A of the cylindrical portion 46c and the axis B of the fixed shaft 43 is at least 8° and at most 30°. In FIG. 5, the angle $\alpha$ defined by the center axis A and the axis B is 17°.

With this spinning reel, the bail arm 34 falls into line-release position when line is let out, for example during casting. This causes the first bail support member 40 and the second bail support member 42 to pivot. As a result, the fishing line is reeled out from the front side of the spool 4, due to the weight of the bait.

During winding of the fishing line, the bail arm 34 is returned to a line-guiding position. This is achieved automatically with a bail flipping mechanism (not shown in the drawings) when the handle 1 is rotated in the direction to take up line. The torque of the handle 1 is transmitted over the handle shaft 10 and the master gear 11 to the pinion gear 12. The torque transmitted to the pinion gear 12 is transmitted from the front end of the pinion gear 12 to the rotor 3, and through the intermediate gear 23 meshing with the pinion gear 12 to the oscillating mechanism 6. As a result, the rotor 3 rotates in the direction to take up the fishing line, and the spool 4 shifts back and forth.

The fishing line contacting the bail 41 when an operation to take up the fishing line is commenced is guided by the bail 41 to the fixed shaft cover 46. The fishing line guided by the fixed shaft cover 46 is guided by the line roller 44 to change its direction, such that the fishing line is eventually wound around the spool 4.

In this spinning reel, the fixed shaft cover 46 is formed by a die forming process, such as forging, and the fixed shaft 43 is formed by a machining process, such as cutting. Here, since the fixed shaft cover 46 is formed by a die forming process, the manufacturing costs can be reduced as compared to forming the fixed shaft cover 46 by a machining process.

Furthermore, the fixed shaft cover 46 is formed such that the angle defined by the center axis A of the cylindrical portion 46c and the axis B of the fixed shaft 43 is at least 8° and at most 30°. Therefore, the fishing line guiding path from the bail 41 to the line roller 44 is smooth, and the fishing line is not easily caught. Consequently, the fishing line can be guided smoothly from the bail 41 to the line roller 44.

Other Embodiments (a) The above embodiment has been described taking an example of a front drag spinning reel, but the present invention can also be applied to any type of spinning reel, such as rear drag spinning reels, spinning reels without drag control, lever drag spinning reels, etc.

(b) In the above embodiment, the fixed shaft 43 is formed as one unitary piece with the fixed shaft cover 46, but it is also possible to provide the fixed shaft 43 and the fixed shaft cover 46 as separate elements. Moreover, the bail 41 is fixed to the fixed shaft cover 46, but the present invention is not limited to such arrangement; the bail 41 can also be fixed to the fixed shaft 43.

(c) In the above embodiment, the fixed shaft cover 46 is formed by forging, which is a die forming process, and the fixed shaft 43 is formed by cutting, which is a machining process. However, the present invention is not limited to such arrangement; other types of die forming or machining processes such as molding or die casting can also be employed.

With the present invention, the manufacturing costs of the fishing line guiding mechanism in a spinning reel can be reduced, because the fixed shaft cover is formed by a die forming process. Also, the fishing line can be guided smoothly to the line roller, because the fixed shaft cover is formed such that the angle defined by center axis of the cylindrical portion and the axis of the fixed shaft is at least 8° and at most 30°.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-311020. The entire disclosure of Japanese Patent Application No. 2001-311020 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A fishing line guiding mechanism for a spinning reel for guiding fishing line to a spool of the spinning reel, said fishing line guiding mechanism being adapted to be mounted to ends of a first rotor arm and a second rotor arm of a spinning reel so as to be pivotable between a line-guiding position and a line-release position, said fishing line guiding mechanism comprising:

a first bail support member adapted to be mounted pivotably to the first rotor arm;

a second bail support member adapted to be mounted pivotably to the second rotor arm;

a fixed shaft formed by a machining process, one of ends of said fixed shaft being fixedly coupled to said first bail support member;

a fixed shaft cover fixedly coupled to the other of said ends of said fixed shaft and disposed at a predetermined space from said first bail support member, said fixed shaft cover having a guiding portion that guides the fishing line along its outer circumference and has a cylindrical portion having a cylindrical outer circumference, said fixed shaft cover being formed by a die forming process such that an angle between a center axis of said cylindrical portion and an axis of the fixed shaft is at least 8° and at most 30°;

a line roller rotatably supported by said fixed shaft and provided with a roller for guiding the fishing line around its peripheral surface; and a bail adapted to be disposed curved in an outer circumference of the spool for guiding the fishing line over said fixed shaft cover to said line roller, said bail having a first end that is fixedly coupled to said second bail support member and a second end that is fixedly coupled to one of said fixed shaft and said fixed shaft cover.

2. The fishing line guiding mechanism for a spinning reel as set forth in claim 1, wherein said fixed shaft cover is formed such that an axial length of said cylindrical portion is at least 1 mm and at most 3 mm.

3. The fishing line guiding mechanism for a spinning reel as set forth in claim 1, wherein said fixed shaft cover is a cone-shaped member having a vertex portion, and said second end of said bail is joined with said fixed shaft cover such that said bail and said guiding portion form a continuously smooth surface.

4. The fishing line guiding mechanism for a spinning reel as set forth in claim 3, wherein said fixed shaft cover further includes a recessed portion formed on a side of said fixed shaft cover opposite said guiding portion.

5. The fishing line guiding mechanism for a spinning reel as set forth in claim 4, wherein said cylindrical portion is formed below said recessed portion.

6. The fishing line guiding mechanism for a spinning reel as set forth in claim 3, wherein said bail extends in a direction tilted toward said guiding portion relative to a direction in which said vertex portion points.

7. The fishing line guiding mechanism for a spinning reel as set forth in claim 1, wherein said fixed shaft and said fixed shaft cover are formed as one unitary piece.

8. A spinning reel, comprising:

a reel unit rotatively supporting a handle;

a rotor rotatively supported at a front of said reel unit, said rotor including a rotor body to which rotation of said handle is transmitted, a first rotor arm disposed on a side of said rotor body, a second rotor arm disposed on a side of said rotor body opposite said first rotor arm, and a bail arm mounted to ends of said first and second rotor arms so as to be pivotable between a line-guiding position and a line-releasing position, said bail arm including a first bail support member mounted pivotably to said first rotor arm, a second bail support member mounted pivotably to said second rotor arm, a fixed shaft formed by a machining process, one of ends of said fixed shaft being fixedly coupled to said first bail support member, a fixed shaft cover fixedly coupled to the other of said ends of said fixed shaft and disposed at a predetermined space from said first bail support member, said fixed shaft cover having a guiding portion that guides the fishing line along its outer circumference and has a cylindrical portion having a cylindrical outer circumference, said fixed shaft cover being formed by a die forming process such that an angle between a center axis of said cylindrical portion and an axis of the fixed shaft is at least 8° and at most 30°, a line roller rotatably supported by said fixed shaft and provided with a roller for guiding the fishing line around its peripheral surface, and a bail for guiding the fishing line over said fixed shaft cover to said line roller, said bail having a first end that is fixedly coupled to said second bail support member and a second end that is fixedly coupled to one of said fixed shaft and said fixed shaft cover; and a spool disposed at a front of said rotor between said first and second rotor arms such that said bail is disposed curved in an outer circumference of said spool, said spool being shiftable front and rear and winding a fishing line around its outer peripheral surface.

9. The spinning reel as set forth in claim 8, wherein said fixed shaft cover is formed such that an axial length of said cylindrical portion is at least 1 mm and at most 3 mm.

10. The spinning reel as set forth in claim 8, wherein said fixed shaft cover is a cone-shaped member having a vertex portion, and said second end of said bail is joined with said fixed shaft cover such that said bail and said guiding portion form a continuously smooth surface.

11. The spinning reel as set forth in claim 10, wherein said fixed shaft cover further includes a recessed portion formed on a side of said fixed shaft cover opposite said guiding portion.

12. The spinning reel as set forth in claim 11, wherein said cylindrical portion is formed below said recessed portion.

13. The spinning reel as set forth in claim 10, wherein said bail extends in a direction tilted toward said guiding portion relative to a direction in which said vertex portion points.

14. The spinning reel as set forth in claim 8, wherein said fixed shaft and said fixed shaft cover are formed as one unitary piece.

* * * * *